(12) United States Patent
Jang et al.

(10) Patent No.: US 10,787,146 B2
(45) Date of Patent: Sep. 29, 2020

(54) AIRBAG APPARATUS

(71) Applicant: HYUNDAI MOBIS CO., LTD., Seoul (KR)

(72) Inventors: Rae Ick Jang, Seongnam-si (KR); Seok Min Lee, Yongin-si (KR); Jae Hyun Lee, Anyang-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 76 days.

(21) Appl. No.: 16/112,514

(22) Filed: Aug. 24, 2018

(65) Prior Publication Data

US 2019/0061670 A1 Feb. 28, 2019

(30) Foreign Application Priority Data

Aug. 31, 2017 (KR) .................. 10-2017-0110809
Aug. 31, 2017 (KR) .................. 10-2017-0110814

(51) Int. Cl.
| | | |
|---|---|---|
| *B60R 21/233* | (2006.01) | |
| *B60R 21/26* | (2011.01) | |
| *B60R 21/2338* | (2011.01) | |
| *B60R 21/237* | (2006.01) | |
| *B60R 21/239* | (2006.01) | |
| *B60R 21/00* | (2006.01) | |

(52) U.S. Cl.
CPC .......... *B60R 21/233* (2013.01); *B60R 21/237* (2013.01); *B60R 21/239* (2013.01); *B60R 21/2338* (2013.01); *B60R 21/26* (2013.01); *B60R 2021/0004* (2013.01); *B60R 2021/0009* (2013.01); *B60R 2021/0048* (2013.01); *B60R 2021/2395* (2013.01); *B60R 2021/23308* (2013.01); *B60R 2021/23332* (2013.01); *B60R 2021/23382* (2013.01); *B60R 2021/23386* (2013.01); *B60R 2021/26094* (2013.01)

(58) Field of Classification Search
CPC . B60R 21/233; B60R 21/239; B60R 21/2338; B60R 2021/23386; B60R 2021/2395; B60R 2021/23332; B60R 2021/26094; B60R 2021/23382; B60R 21/26; B60R 21/237
USPC ........................................................ 280/729
See application file for complete search history.

(56) References Cited

U.S. PATENT DOCUMENTS 5,853,191 A * 12/1998 Lachat .............. B60R 21/23138
280/730.2
7,938,445 B2 * 5/2011 Smith ................. B60R 21/2338
280/743.2

(Continued)

*Primary Examiner* — Paul N Dickson
*Assistant Examiner* — Kurtis Nielson
(74) *Attorney, Agent, or Firm* — Knobbe Martens Olson & Bear LLP

(57) ABSTRACT

An airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; a communication part formed in the first chamber so as to introduce gas of the first chamber into the second chamber; and a valve tether installed along the circumference of the communication part, connected to the first chamber, and closing the communication part when the first chamber is completely deployed.

13 Claims, 16 Drawing Sheets

(56) References Cited

U.S. PATENT DOCUMENTS

| | | | |
|---|---|---|---|
| 9,650,011 B1* | 5/2017 | Belwafa | B60R 21/233 |
| 2008/0023950 A1* | 1/2008 | Kalczynski | B60R 21/2338 |
| | | | 280/739 |
| 2008/0073893 A1* | 3/2008 | Schneider | B60R 21/2338 |
| | | | 280/740 |
| 2009/0230663 A1* | 9/2009 | Mills | B60R 21/233 |
| | | | 280/735 |
| 2015/0042082 A1* | 2/2015 | Koshikawa | B60R 21/203 |
| | | | 280/739 |
| 2015/0158452 A1* | 6/2015 | Choi | B60R 21/233 |
| | | | 280/732 |
| 2015/0298643 A1* | 10/2015 | Schneider | B60R 21/239 |
| | | | 280/729 |
| 2016/0046254 A1* | 2/2016 | Yamada | B60R 21/233 |
| | | | 280/729 |
| 2016/0059817 A1* | 3/2016 | Umehara | B60R 21/233 |
| | | | 280/729 |
| 2016/0159311 A1* | 6/2016 | Yamada | B60R 21/233 |
| | | | 280/729 |
| 2017/0217397 A1* | 8/2017 | Sumiya | B60R 21/233 |

* cited by examiner

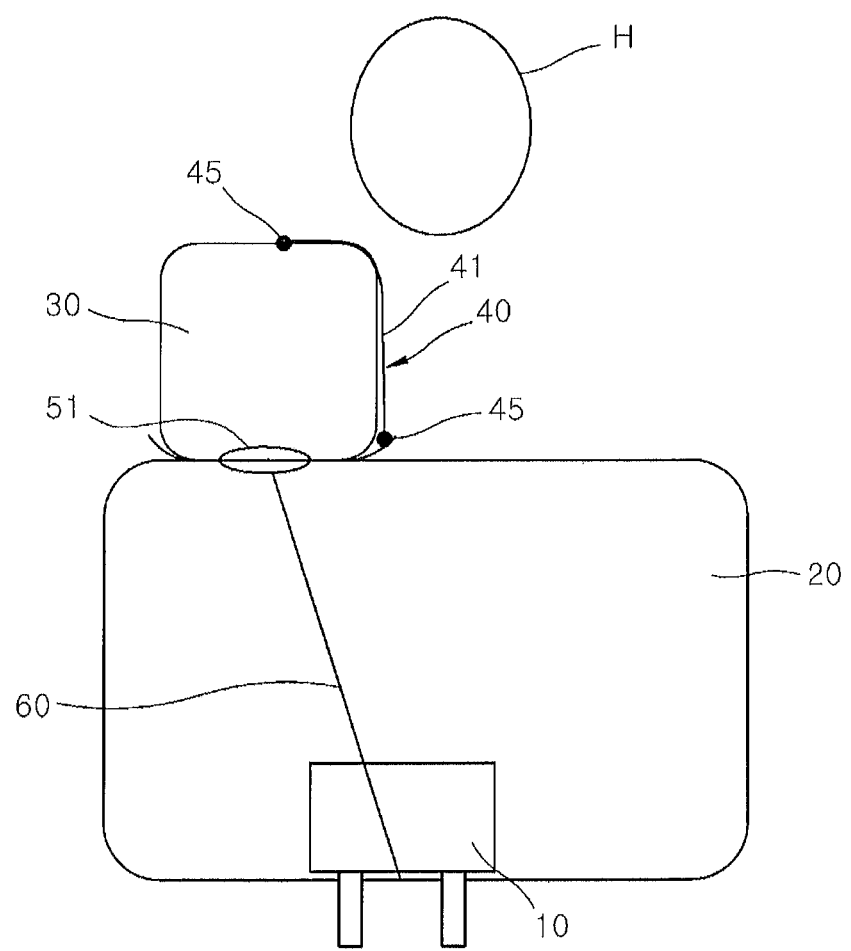

AIRBAG APPARATUS

CROSS-REFERENCES TO RELATED APPLICATIONS

The present application claims priority to Korean application numbers 10-2017-0110814 and 10-2017-0110809, filed on Aug. 31, 2017, which are incorporated by reference in their entirety.

BACKGROUND OF THE INVENTION

The present invention relates to an airbag apparatus, and more particularly, to an airbag apparatus which can suppress the head of a passenger from turning or moving in a diagonal direction in case of an oblique collision of a vehicle.

In general, a vehicle includes airbags to protect a passenger. The airbags are disposed at various positions depending on a passenger's parts which need to be protected. A steering wheel includes a driver airbag to protect the head of a driver, and a passenger airbag is installed at the front of the vehicle so as to protect the head of a passenger seated beside the driver.

In case of a head-on or oblique collision, an electronic control module decides whether to ignite a detonator of an inflator. When gas is generated from the inflator, an airbag cushion is expanded by the generated gas. Recently, the strict regulations for protecting passengers have increased the size of the airbag cushion.

However, when gas leaks from the airbag cushion after the airbag cushion is completely expanded, the support force or expansive force of the airbag cushion may be reduced. The reduction of the support force or expansive force may make it difficult to prevent the head of a passenger from moving in a diagonal direction from the airbag cushion.

However, since the increase in size of the airbag cushion increases the expansion time of the airbag cushion, the time for the airbag cushion to hold the head may be delayed in case of an oblique collision of the vehicle. When the time for the airbag cushion to hold the head is delayed, the head or neck may be injured because the head cannot be suppressed from moving in the diagonal direction.

Therefore, there is a demand for a device capable of solving the problem.

SUMMARY OF THE INVENTION

Embodiments of the present invention are directed to an airbag apparatus which can suppress the head of a passenger from turning or moving in a diagonal direction in case of an oblique collision of a vehicle.

In one embodiment, an airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; a communication part formed in the first chamber so as to introduce gas of the first chamber into the second chamber; and a valve tether installed along the circumference of the communication part, connected to the first chamber, and closing the communication part when the first chamber is completely deployed.

The second chamber may be eccentrically disposed at the inboard side of the first chamber so as to avoid a collision with the head of the passenger in case of a head-on collision of the vehicle.

The second chamber may be double-folded in such a manner that one side thereof is introduced to the inside, and the folded part of the second chamber may be temporarily attached to the first chamber.

The communication part may include: a communication tube formed on the first chamber to introduce gas of the first chamber into the second chamber, and having the valve tether connected thereto; and one or more communication holes formed in the first chamber to introduce the gas of the first chamber into the second chamber.

The communication tube may have a larger diameter than the communication hole.

The communication tube may have a ring-shaped tightening channel part formed at the circumference thereof, and the valve tether may include: a tether ring part installed through the tightening channel part; and a tether pulling part connected to the tether ring part to pull the tether ring part, and connected to the first chamber so as to close the communication tube by pulling the tether ring part, when the first chamber is completely deployed.

The valve tether may be obliquely disposed toward the widthwise center of the first chamber.

In another embodiment, an airbag apparatus may include: a first chamber connected to an inflator, and supporting the head of a passenger in case of a head-on collision of a vehicle; a second chamber connected to one side of the first chamber so as to be supported by the first chamber, and suppressing the head of the passenger from moving in a diagonal direction in case of an oblique collision of the vehicle; and a connection tether connecting the first and second chambers so as to restrict the second chamber from being pushed to the outside of the first chamber by the load of the head.

The second chamber may be eccentrically disposed at the inboard side of the first chamber so as to avoid a collision with the head of the passenger in case of a head-on collision of the vehicle.

One side of the connection tether may be connected to the second chamber, and the other side of the connection tether may be connected to the first chamber so as to be separated from the second chamber.

One side of the connection tether may be connected to the second chamber, and the other side of the connection tether may be connected to a second sewed part of the first chamber or the edge of the second sewed part.

Both sides of the connection tether may be fixed to the first and second chambers by connection sewed parts.

The connection tether may include a surface tether which connects the rear side of the first chamber and the rear side of the second chamber.

The connection tether may include one or more line tethers which connect the rear side of the first chamber and the rear side of the second chamber.

The airbag apparatus may further include: a communication tube formed in the first chamber so as to introduce gas of the first chamber into the second chamber; and a valve tether installed along the circumference of the communication tube, connected to the first chamber, and closing the communication tube when the first chamber is completely deployed.

The communication tube may have a ring-shaped tightening channel part formed at the circumference thereof, and the valve tether may include: a tether ring part installed through the tightening channel part; and a tether pulling part connected to the tether ring part to pull the tether ring part, and connected to the first chamber so as to close the communication tube by pulling the tether ring part, when the first chamber is completely deployed.

BRIEF DESCRIPTION OF THE DRAWINGS

FIG. 16 is a front view illustrating that the connection tether is connected to the edge of a second sewed part in the first chamber in the airbag apparatus in accordance with the embodiment of the present invention.

DESCRIPTION OF SPECIFIC EMBODIMENTS

Hereafter, an airbag apparatus in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
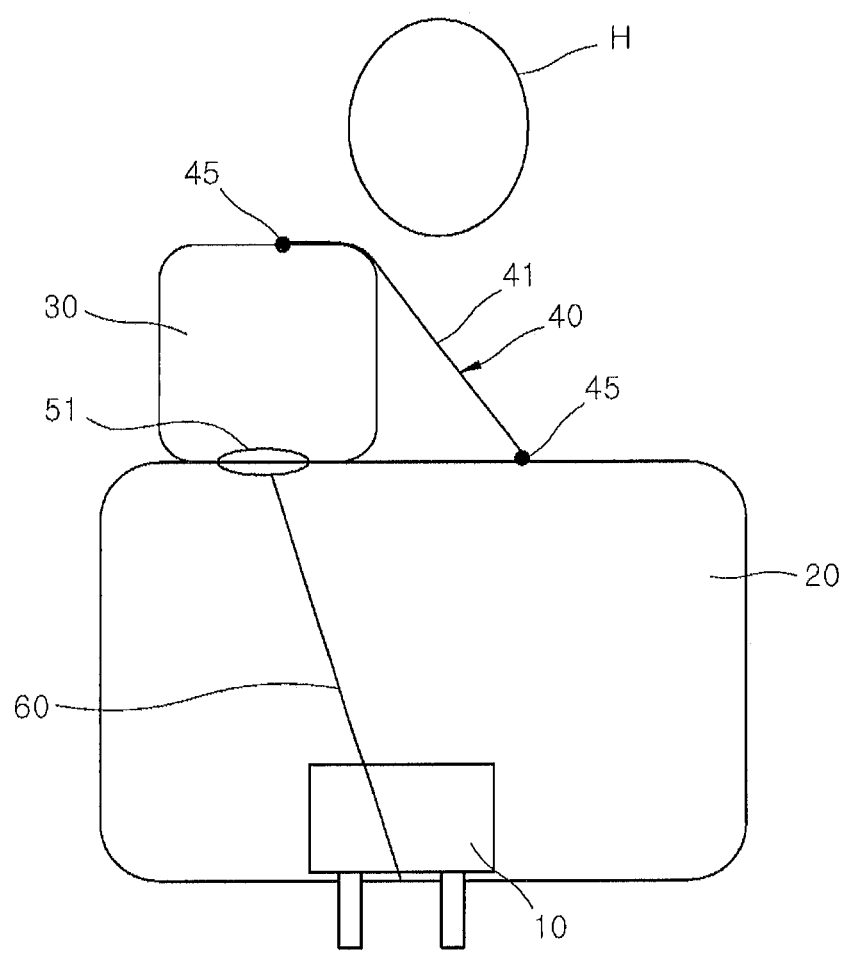
FIG. 1 is a plan view illustrating an airbag apparatus in accordance with an embodiment of the present invention.
Figure 2:
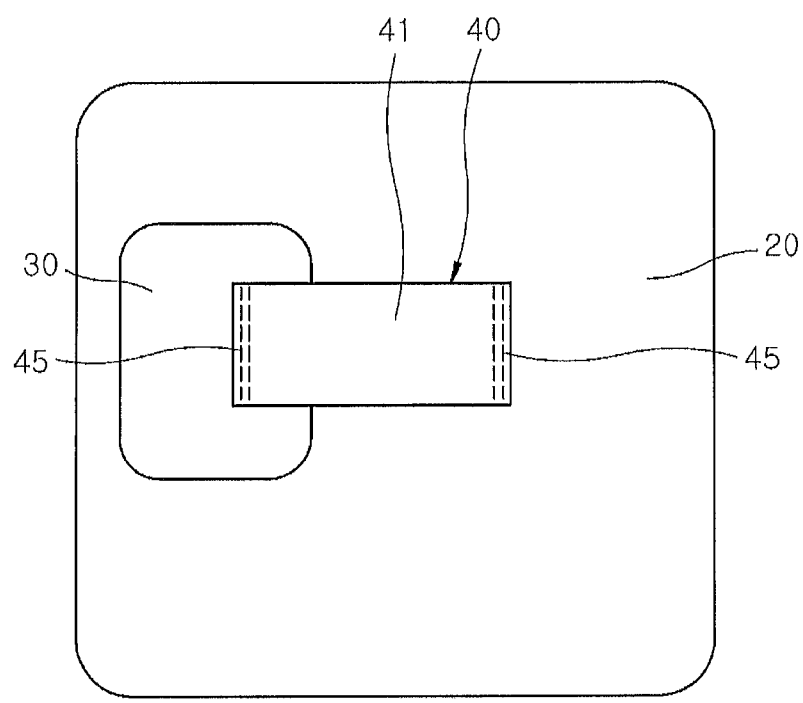
FIG. 2 is a front view illustrating the airbag apparatus in accordance with the embodiment of the present invention.
Figure 3:
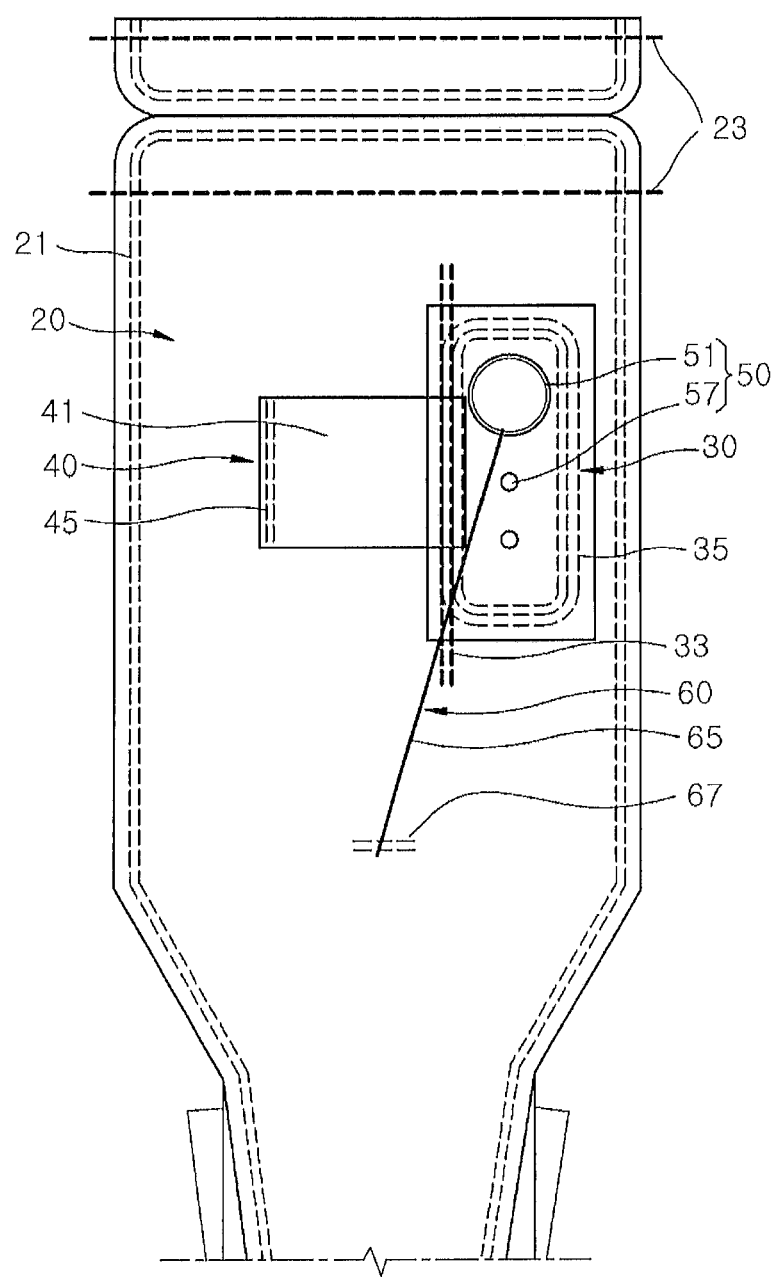
FIG. 3 illustrates that the airbag apparatus in accordance with the embodiment of the present invention is unfolded.
Figure 4:
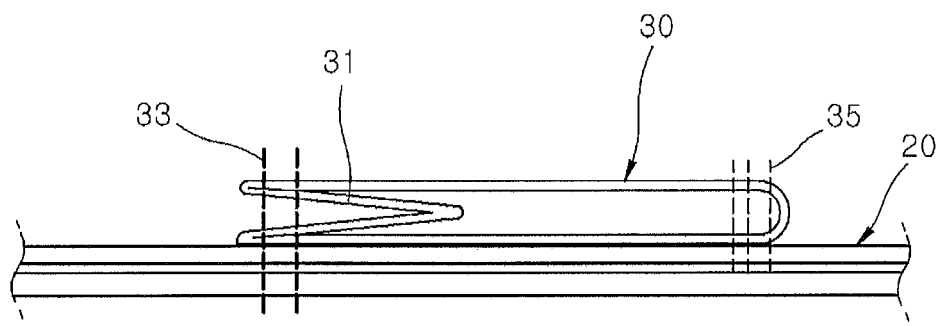
FIG. 4 is a cross-sectional view illustrating that a second chamber is double-folded and installed on a first chamber in the airbag apparatus in accordance with the embodiment of the present invention.
Figure 5:
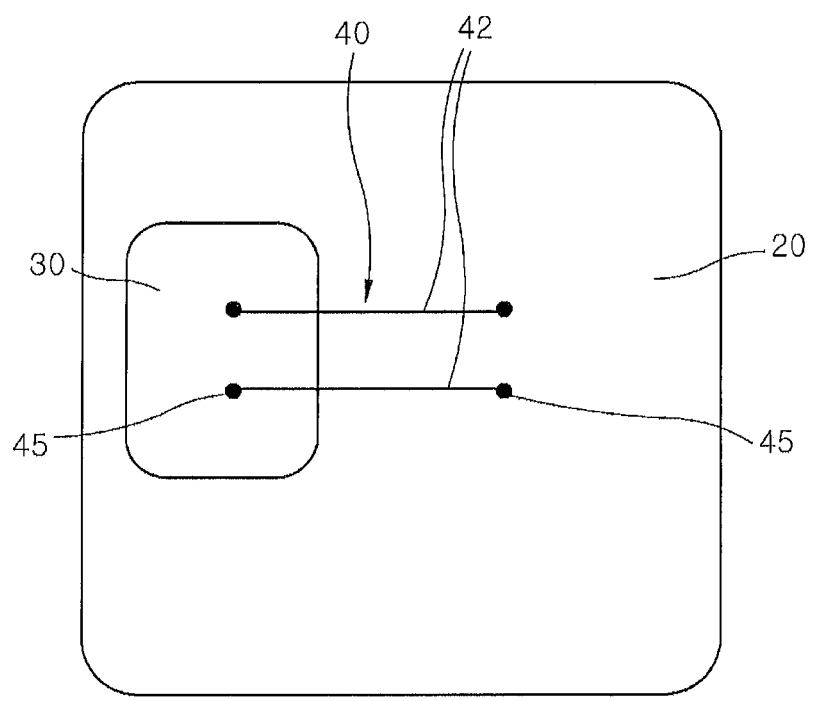
FIG. 5 is a front view illustrating another example of a connection tether in the airbag apparatus in accordance with the embodiment of the present invention.

FIG. 1 is a plan view illustrating an airbag apparatus in accordance with an embodiment of the present invention, FIG. 2 is a front view illustrating the airbag apparatus in accordance with the embodiment of the present invention, FIG. 3 illustrates that the airbag apparatus in accordance with the embodiment of the present invention is unfolded, FIG. 4 is a cross-sectional view illustrating that a second chamber is double-folded and installed on a first chamber in the airbag apparatus in accordance with the embodiment of the present invention, FIG. 5 is a front view illustrating another example of a connection tether in the airbag apparatus in accordance with the embodiment of the present invention, and FIG. 16 is a front view illustrating that the connection tether is connected to the edge of a second sewed part in the first chamber in the airbag apparatus in accordance with the embodiment of the present invention.

Referring to FIGS. 1 to 5 and 16, the airbag apparatus in accordance with the embodiment of the present invention may include a first chamber 20, a second chamber 30, a connection tether 40, a communication part 50 and a valve tether 60.

The first chamber 20 may be connected to the inflator 10, and support a head H in case of a head-on collision of a vehicle. When the first chamber 20 is completely deployed, the first chamber 20 may have a rectangular box shape. The first chamber 20 may be supported by an instrument panel (not illustrated) at the inner front of the vehicle.

The second chamber 30 may be connected to the first chamber 20 by a second sewed part 35. The second sewed part 35 may be formed in a rectangular frame shape along the edge of the second chamber 30.

The second chamber 30 may be connected to the rear of the first chamber 20 so as to be supported by the first chamber 20, and suppress the head H of a passenger from moving in a diagonal direction in case of an oblique collision of the vehicle. That is, the second chamber 30 may support one side of the head H while blocking the one side of the head H, in case of an oblique collision of the vehicle. Therefore, the head H of the passenger can be prevented from being pushed and turned to one side of the second chamber 30, which makes it possible to shorten the time required for holding the head H. Since a turn of the head H is prevented in case of an oblique collision of the vehicle, an injury of the head H or the neck can be prevented. Furthermore, although the size of the first chamber 20 is not increased or the increase of the size is minimized, it is possible to protect the head H of the passenger.

The second chamber 30 may be eccentrically disposed at the inboard side of the first chamber 20, in order to avoid a collision with the head H of the passenger in case of a head-on collision of the vehicle. The inboard side may indicate the widthwise center of the vehicle. The width of the second chamber 30 or the length of the second chamber 30 in the widthwise direction of the vehicle may be set to less than a half of the width of the first chamber 20. Thus, although the second chamber 30 is expanded and deployed rearward in case of a head-on collision of the vehicle, the head H can be prevented from being pushed rearward by the second chamber 30, which makes it possible to prevent the head from being injured or bent rearward by the second chamber 30.

The edge of the first chamber 20 may be sewed through a first sewed part 21. The top of the first chamber 20 may be sewed through a reinforcement sewed part 23. Since the top of the first chamber 20 is sewed through the reinforcement sewed part 23, the top of the first chamber 20 can be prevented from an external shock.

The second chamber 30 may be double-folded in such a manner that one side thereof is introduced to the inside, and an end portion of the folded part 31 of the second chamber 30 may be temporarily attached to the first chamber 20. The folded part 31 of the second chamber 30 may be formed by folding the second chamber 30 once or a plurality of times. The folded part 31 of the second chamber 30 may face the inboard side of the vehicle. Since the second chamber 30 is double-folded in such a manner that one side thereof is introduced to the inside, the length of the second chamber 30 can be increased more than when the second chamber 30 is installed without a folded part. Furthermore, since the expansion height of the second chamber 30 can be sufficiently increased when the second chamber 30 is expanded and deployed, the head H of a passenger can be rapidly held. Therefore, in case of an oblique collision of the vehicle, the head H of the passenger can be held by the second chamber 30, and thus prevented from turning or moving in a diagonal direction.

Since the folded part 31 of the second chamber 30 is temporarily attached to the first chamber 20, the temporary attachment part 33 may be torn when the second chamber 30 is expanded and deployed.

When the first chamber 20 is sewed, the folded part 31 of the second chamber 30 may be temporarily attached to the first chamber 20. Therefore, since the second chamber 30 can be temporarily attached to the first chamber 20 through one sewing process, it is possible to reduce the manufacturing time and cost of the airbag apparatus.

The communication part 50 may include a communication tube 51 and one or more communication holes 57.

The valve tether 60 may be disposed obliquely toward the widthwise center of the first chamber 20. At this time, the valve tether 60 may be fixed to the first chamber 20 by a valve sewed part 67. When the first chamber 20 has a constant expansion height, the installation length of the valve tether 60 may be increased in the case where the valve tether 60 is installed obliquely toward the center of the second chamber 30. Furthermore, when the valve tether 60 is installed perpendicular to the first chamber 20, the installation length of the valve tether 60 may be decreased.

When the length of a tether pulling part 65 is too small, the communication tube 51 may be closed before the first chamber 20 is completely deployed. On the other hand, when the length of the tether pulling part 65 is too large, the communication tube 51 may not be completely closed even after the deployment of the first chamber 20 is completed. In the embodiment of the present invention, since the tether pulling part 65 is disposed obliquely toward the widthwise center of the first chamber 20, the installation length of the tether pulling part 65 can be adjusted in consideration of the expansion height of the first chamber 20. Therefore, the tether pulling part 65 may be installed so as to completely close the communication tube 51 when the deployment of the first chamber 20 is completed.

The connection tether 40 may connect the first and second chambers 20 and 30 to restrict the second chamber 30 from being pushed to the outside of the first chamber 20 by the load of the head H. For example, the connection tether 40 may restrict the second chamber 30 from being pushed or leaning to the inboard side.

At this time, one end of the connection tether 40 may be connected to a position separated from the second chamber 30 in the first chamber 20 or connected to the second sewed part 35 of the second chamber 30 (refer to FIG. 2).

One side of the connection tether 40 may be connected to the second chamber 30, or the other side of the connection tether 40 may be connected to the second sewed part 35 of the first chamber 20 or the edge of the second sewed part 35 (refer to FIG. 16).

The connection tether 40 may apply a tensile force to the second chamber 30 to pull the second chamber 30 toward the first chamber 20, when the first and second chambers 20 and 30 are expanded.

The connection tether 40 is a chamber belonging which is installed outside the second sewed part 35 and not fixed by the second sewed part 35. One side of the connection tether 40 may be disposed at the inboard side of the first chamber 20 (center side), and the other side of the connection tether 40 may be disposed at the outboard side of the first chamber 20 (window side). Therefore, when the first and second chambers 20 and 30 are expanded, the connection tether 40 may apply a tensile force to the second chamber 30 to pull the second chamber 30 to the outboard.

In case of an oblique collision of the vehicle, the connection tether 40 and the second chamber 30 may be deformed in a stepwise manner while absorbing the load of the head H. That is, the head H may be primarily held by the connection tether 40, and then secondarily held by the second chamber 30. Therefore, since the time required for holding the head H is shortened in case of an oblique collision of the vehicle, an injury of the head H or the neck can be prevented while a turn of the head H is restricted.

When the head H is moved obliquely in a diagonal direction of the vehicle in case of the oblique collision of the vehicle, the connection tether 40 may pull the second chamber 30 toward the first chamber 20 using the support force (reaction force) of the first chamber 20 or the support force of the first chamber 20 and the tensile force of the connection tether 40, thereby preventing the head H from being away from the second chamber 30. Therefore, although the sizes of the first and second chambers 20 and 30 are not increased, it is possible to protect the head H.

When the head H applies a load to the connection tether 40 and the first chamber 20 in case of a head-on collision of the vehicle, the connection tether 40 and the first chamber 20 may absorb the load of the head H in a stepwise manner. At this time, when the first chamber 20 is contracted forward by the load of the head H, the load of the head H can be buffered by the tensile force of the connection tether 40 and the reaction force of the second chamber 30 because the reaction force of the second chamber 30 pulls the connection tether 40.

The connection tether 40 may be disposed at the rears of the first and second chambers 20 and 30 such that the head H comes in contact with the connection tether 40. Therefore, when the head H collides with the first or second chamber 20 or 30, the connection tether 40 can primarily buffer the load of the head H.

The connection tether 40 may include a surface tether 41 which partially covers the rear surface of the first chamber 20 and the rear surface of the second chamber 30 (refer to FIG. 2). The rear surface of the first chamber 20 and the rear surface of the second chamber 30 may come in direct contact with the head H. Both sides of the surface tether 41 may be connected to the first and second chambers 20 and 30 by connection sewed parts 45. The surface tether 41 may indicate a rectangular or elliptical tether of which the width is smaller than the length. When the connection tether 40 is the surface tether 41, the surface tether 41 may uniformly come in contact with a colliding part of the head H, which makes it possible to prevent concentration of pressure on a specific part of the head H. Therefore, the head H can be prevented from being injured by the connection tether 40.

The connection tether 40 may include a plurality of line tethers 42 which connect the first and second chambers 20 and 30 (refer to FIG. 5). Both sides of the line tether 42 may be connected to the first and second chambers 20 and 30 by the connection sewed parts 45. The line tether 42 may indicate a string-type or band-type tether formed in an elongated shape. The number of line tethers 42 may be appropriately designed depending on the heights of the first and second chambers 20 and 30 or the size of the vehicle.

Figure 6:
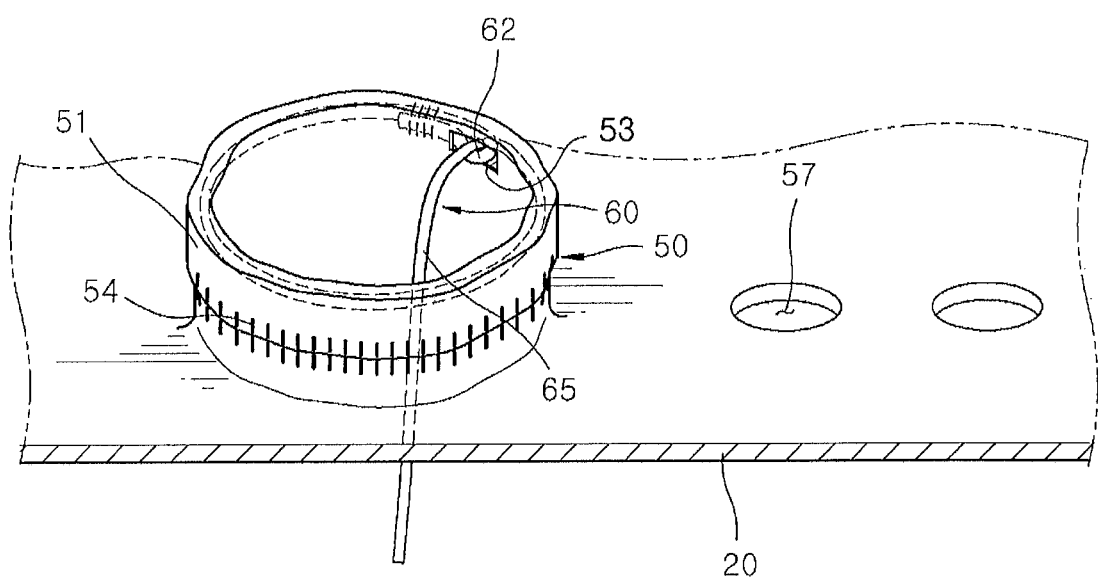
FIG. 6 is a perspective view illustrating a communication part and a valve tether in the airbag apparatus in accordance with the embodiment of the present invention.
Figure 7:
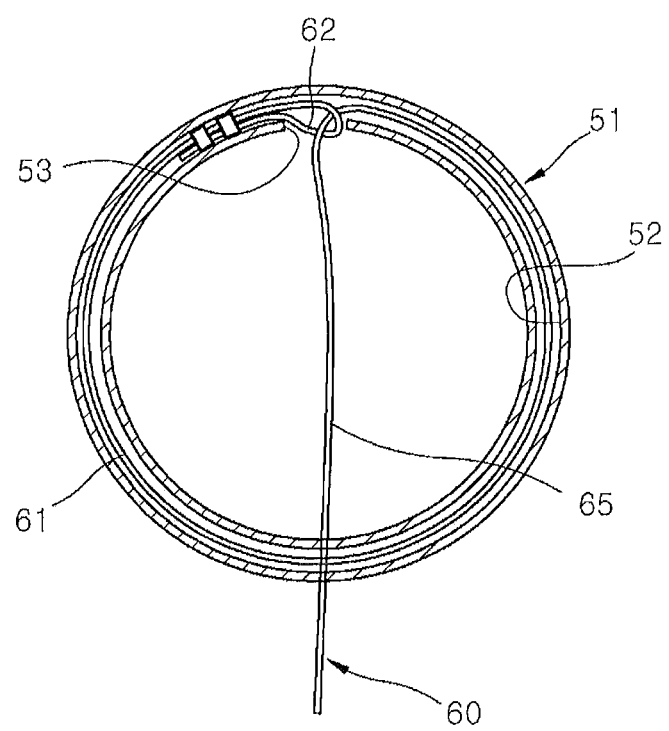
FIG. 7 is a cross-sectional view illustrating the communication part and the valve tether in the airbag apparatus in accordance with the embodiment of the present invention.
Figure 8:
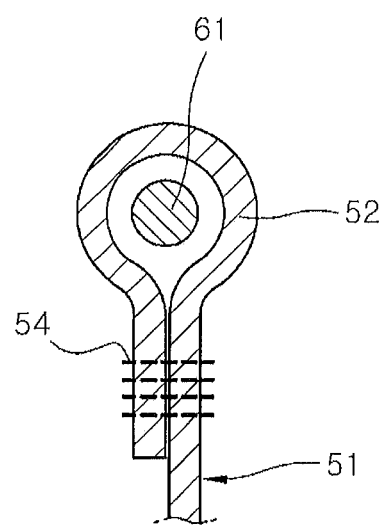
FIG. 8 is a longitudinal sectional view illustrating the communication part and the valve tether in the airbag apparatus in accordance with the embodiment of the present invention.
Figure 9:
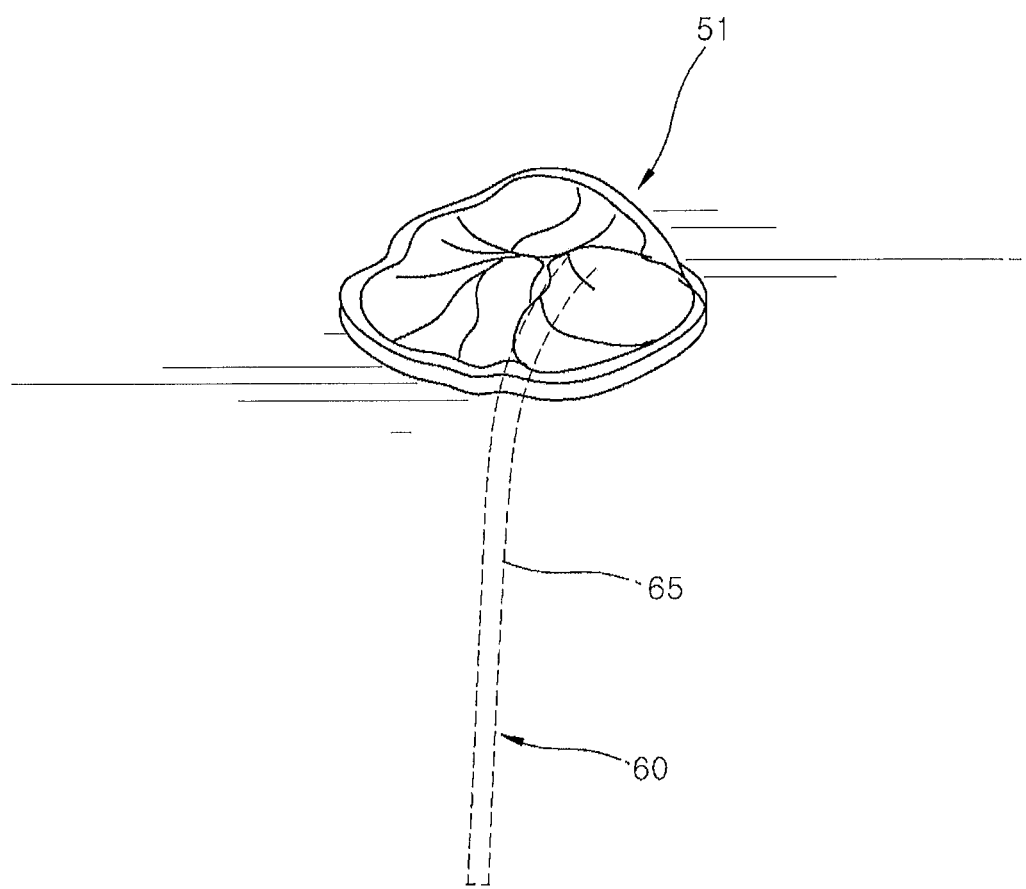
FIG. 9 is a perspective view illustrating that the communication tube is closed by the valve tether in the airbag apparatus in accordance with the embodiment of the present invention.

FIG. 6 is a perspective view illustrating the communication part and the valve tether in the airbag apparatus in accordance with the embodiment of the present invention, FIG. 7 is a cross-sectional view illustrating the communication part and the valve tether in the airbag apparatus in accordance with the embodiment of the present invention, FIG. 8 is a longitudinal sectional view illustrating the communication part and the valve tether in the airbag apparatus in accordance with the embodiment of the present invention, and FIG. 9 is a perspective view illustrating that the communication tube is closed by the valve tether in the airbag apparatus in accordance with the embodiment of the present invention.

Referring to FIGS. 6 to 9, the communication part 50 may be formed on the first chamber 20 so as to introduce gas of the first chamber 20 into the second chamber 30. Since the gas of the first chamber 20 is introduced into the second chamber 30 through the communication part 50, the second chamber 30 may be deployed while expanded by the gas.

The communication part 50 may include the communication tube 51 and the one or more communication holes 57.

The communication tube 51 may be formed on the first chamber 20 so as to introduce the gas of the first chamber 20 into the second chamber 30, and the valve tether 60 may be connected to the communication tube 51. The communication tube 51 may be expanded in a circular tube shape when the gas passes through the communication tube 51. The communication hole 57 may be formed in the first chamber 20 so as to introduce the gas of the first chamber 20 into the second chamber 30.

Since the communication hole 57 includes the communication tube 51 and the one or more communication holes 57, the gas passage area between the first and second chambers 20 and 30 may be increased. Therefore, since the flow rate or velocity of the gas introduced into the second chamber 30 is increased, the second chamber 30 can be rapidly deployed. Thus, before the head H of the passenger reaches the second chamber 30, the second chamber 30 can be completely deployed. Furthermore, since the amount of gas introduced into the second chamber 30 is increased, the support force or holding force of the second chamber 30 can be increased. Therefore, since the second chamber 30 can restrict the movement of the head H in a diagonal direction and suppress a turn of the head H, an injury of the head H or the neck can be prevented.

The communication tube 51 may have a larger diameter than the communication hole 57. The communication hole 57 may be formed in a circular shape. Therefore, the most part of gas may be introduced into the second chamber 30 through the communication tube 51, and the communication hole 57 may serve to further increase the amount of gas introduced into the second chamber 30.

After the second chamber 30 holds the head H to prevent the movement of the head H in the diagonal direction, a part of the gas of the second chamber 30 may be discharged to the first chamber 20 through the communication hole 57. However, since the movement of the head H in the diagonal direction is already suppressed by the second chamber 30, the movement of the head H in the diagonal direction may not resume even though the support force and holding force of the second chamber 30 are slightly reduced.

The valve tether 60 may be installed along the circumference of the communication part 50, and connected to the first chamber 20. When the first chamber 20 is completely deployed, the valve tether 60 may close the communication part 50. Therefore, since the gas of the second chamber 30 is prevented from being rapidly discharged to the first chamber 20, a reduction in support force or holding force of the second chamber 30 can be prevented.

The communication tube 51 may have a ring-shaped tightening channel part 52 formed at the circumference thereof. The communication tube 51 may be formed of the same material as the first chamber 20. Alternatively, the communication tube 51 may be formed of a different material from the first chamber 20, and then sewed to the first chamber 20. The communication tube 51 may be formed in various shapes such as a cylindrical shape and polygonal cylinder shape.

The tightening channel part 52 may be formed through a series of processes of doubling an end portion of the communication tube 51 along the circumference of the communication tube 51 and fixing the doubled end portion to the first chamber 20 through the channel sewed part 54. The tightening channel part 52 may be formed in a ring shape along the circumferential direction at the end of the communication tube 51.

The valve tether 60 may include the tether ring part 61 and the tether pulling part 65.

The tether ring part 61 may be installed through the inside of the tightening channel part 52. The tether pulling part 65 may be connected to the tether ring part 61 so as to pull the tether ring part 61. Furthermore, the tether pulling part 65 may be connected to the first chamber 20 so as to close the communication tube 51 by pulling the tether ring part 61 in one direction when the first chamber 20 is completely deployed.

Since the tether pulling part 65 closes the communication tube 51 by pulling the tether ring part 61, the tether ring part 61 can tighten the communication tube 51, thereby preventing the spread of the communication tube 51. Thus, while gas leakage from the second chamber 30 is prevented, a reduction in expensive force (support force) of the second chamber 30 can be prevented. Therefore, in case of a collision with the head H, the support force of the second chamber 30 can be increased while the head H is suppressed from moving in a diagonal direction.

The tightening channel part 52 may have a through-hole 53 through which the tether pulling part 65 is drawn to the outside of the tightening channel part 52. When the tether pulling part 65 pulls a tether ring part 61, the tether ring part 61 may tighten and close the communication tube 51 while being drawn through the through-hole 53.

The operation of the airbag apparatus in accordance with the embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 10:
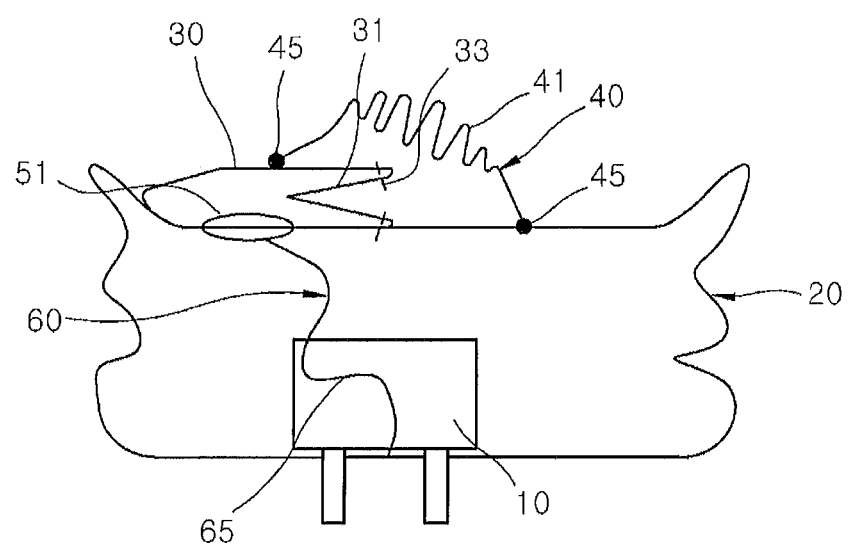
FIG. 10 illustrates that a temporary attachment part of the second chamber in the airbag apparatus in accordance with the first embodiment of the present invention is torn in case of an oblique collision of the vehicle.
Figure 11:
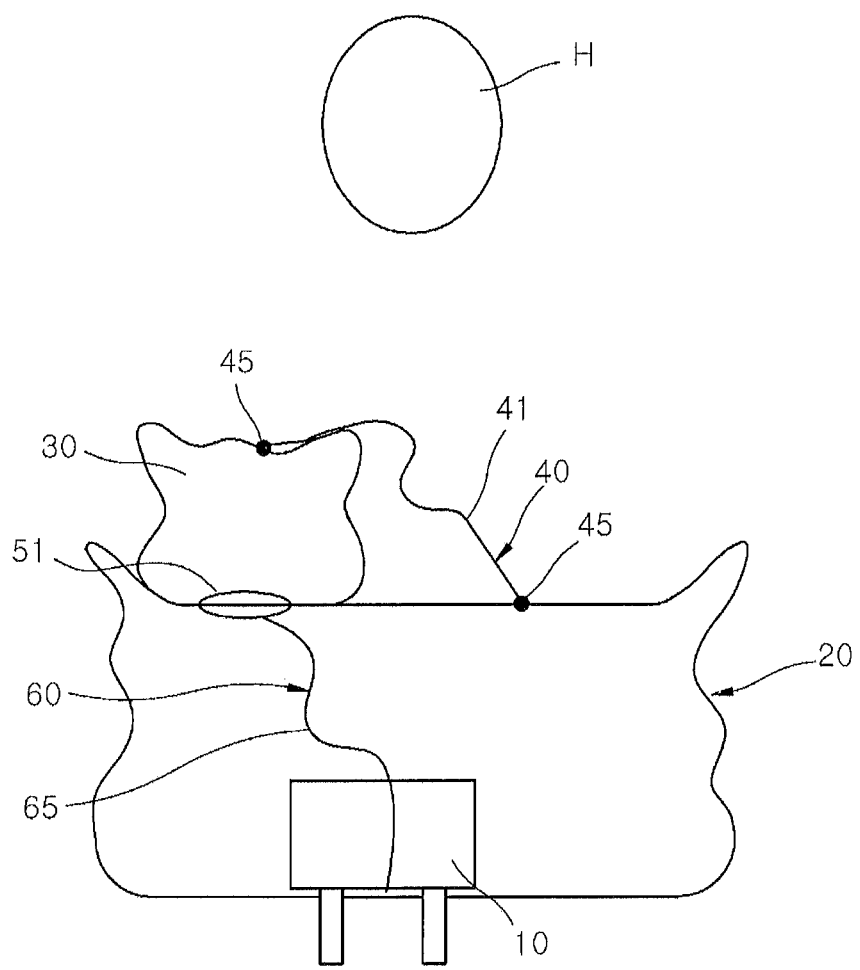
FIG. 11 illustrates that the first and second chambers are being expanded in the airbag apparatus in accordance with the embodiment of the present invention.
Figure 12:
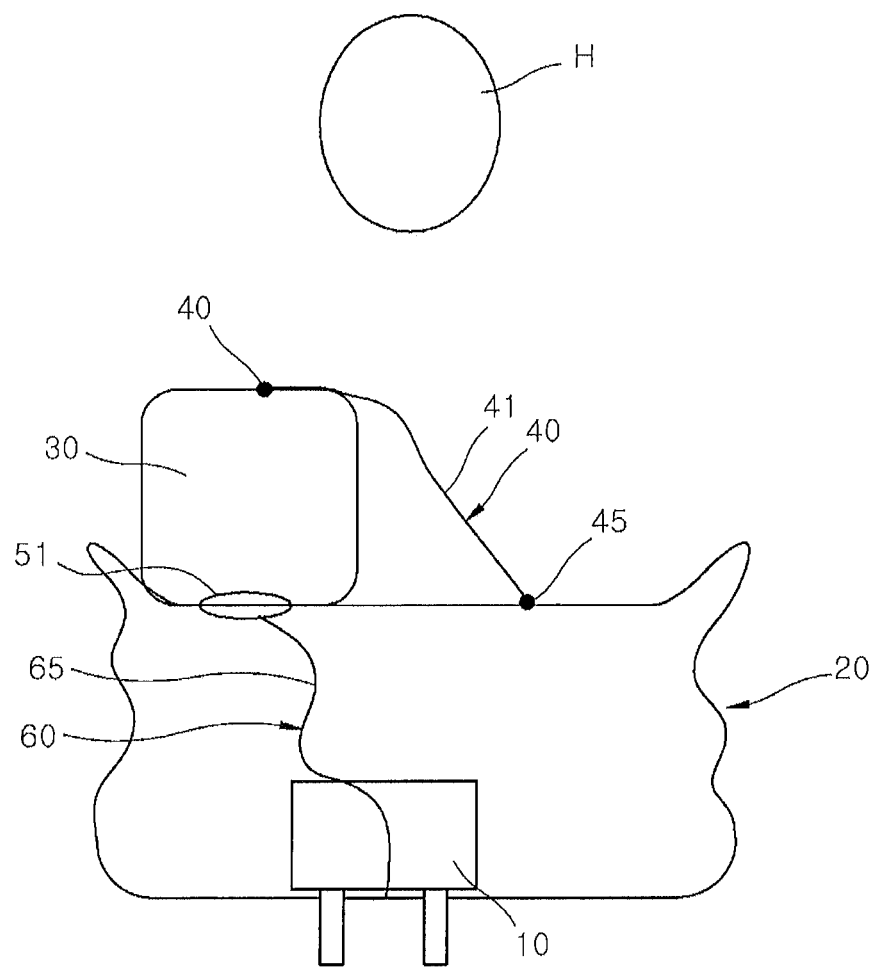
FIG. 12 illustrates that the second chamber is completely deployed in the airbag apparatus in accordance with the embodiment of the present invention.
Figure 13:
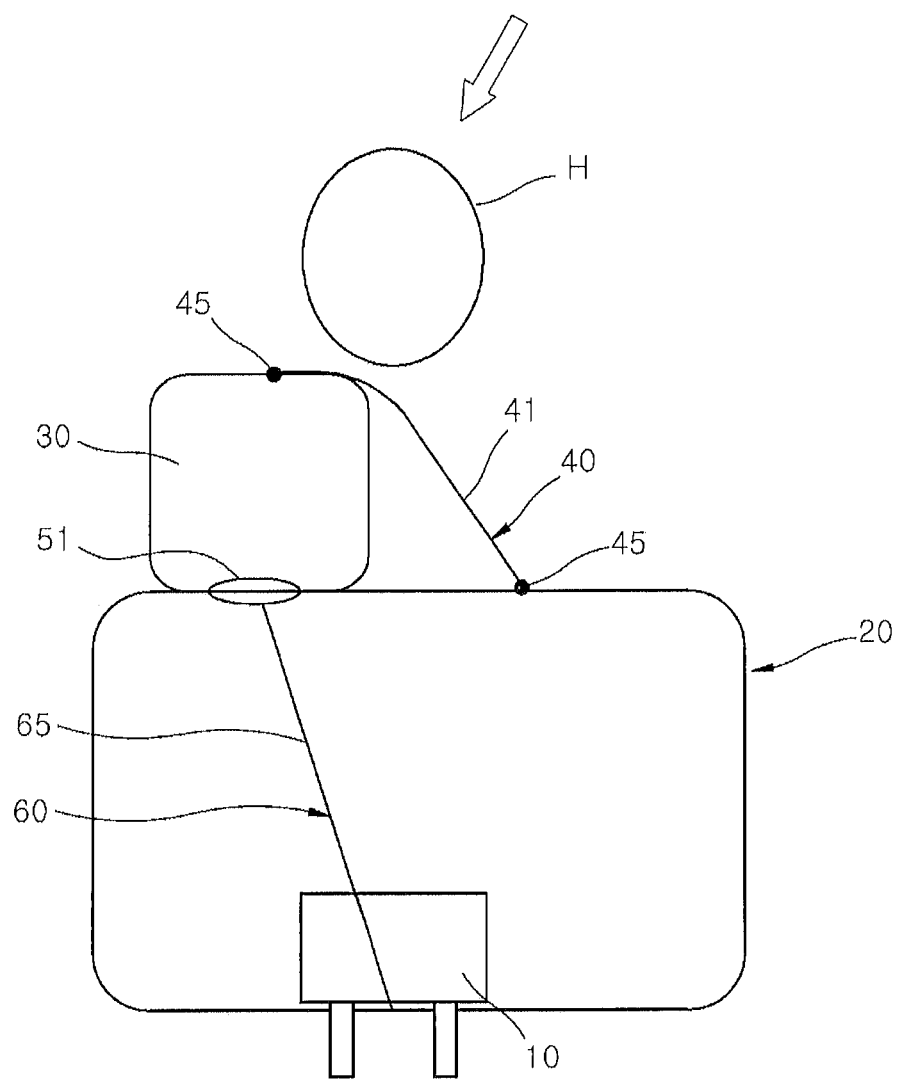
FIG. 13 illustrates that the first and second chambers are completely deployed in the airbag apparatus in accordance with the embodiment of the present invention.
Figure 14:
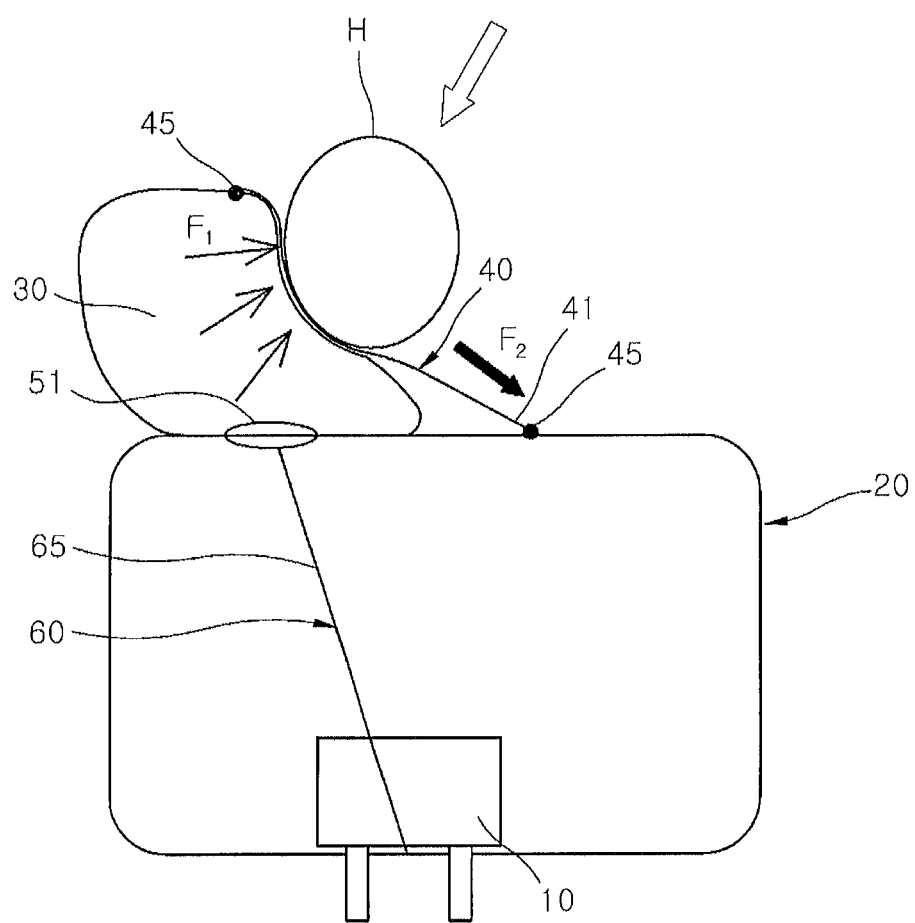
FIG. 14 illustrates that the head of a passenger collides with the second chamber in the airbag apparatus in accordance with the embodiment of the present invention.

FIG. 10 illustrates that a temporary attachment part of the second chamber in the airbag apparatus in accordance with the first embodiment of the present invention is torn in case of an oblique collision of the vehicle, FIG. 11 illustrates that the first and second chambers are being expanded in the airbag apparatus in accordance with the embodiment of the present invention, FIG. 12 illustrates that the second chamber is completely deployed in the airbag apparatus in accordance with the embodiment of the present invention, FIG. 13 illustrates that the first and second chambers are completely deployed in the airbag apparatus in accordance with the embodiment of the present invention, and FIG. 14 illustrates that a head collides with the second chamber in the airbag apparatus in accordance with the embodiment of the present invention.

Referring to FIGS. 10 to 14, gas generated through the inflator 10 may be injected to the first chamber 20 in case of an oblique collision of the vehicle. The first chamber 20 may be deployed while expanded toward the rear of the vehicle. That is, the upper portion of the first chamber 20 may be first expanded and deployed, and the lower portion of the first chamber 20 may be then gradually deployed. The gas of the first chamber 20 may be introduced into the second chamber 30 through the communication tube 51. The expansion of the second chamber 30 may tear the temporary attachment part 33 of the folded part 31 (refer to FIG. 10).

At this time, while the first chamber 20 is deployed, the rear side of the first chamber 20 and the communication tube 51 may be moved toward the rear of the vehicle (refer to FIG. 11). Before the first chamber 20 is completely deployed, the tether ring part 61 may not be pulled by the tether pulling part 65.

The second chamber 30 may be completely deployed before the first chamber 20 (refer to FIG. 12). When the first chamber 20 is almost completely deployed, the communication tube 51 may be away from the rear of the first chamber 20. Therefore, the tether pulling part 65 of the valve tether 60 may be tightly extended toward the rear of the vehicle, and the tether ring part 61 may tighten the communication tube 51 using the tensile force of the tether pulling part 65 (refer to FIGS. 9 and 13). At this time, since the tether ring part 61 closes the communication tube 51 by tightening the communication tube 51, the gas of the second chamber 30 can be prevented from being discharged to the first chamber 20. Therefore, a reduction in expansion force or supporting force of the second chamber 30 may be prevented.

In case of an oblique collision of the vehicle, the head H may be moved forward in a diagonal direction (refer to FIG. 14). As the head H is moved in the diagonal direction, the head H may pressurize the second chamber 30. Therefore, the second chamber 30 can be pressed against the head H and prevent a turn of the head H, which makes it possible to reduce the time required for holding the head H.

Since a turn of the head H is prevented in case of the oblique collision of the vehicle, an injury of the head H or the neck can be prevented. Furthermore, when the head H is obliquely moved toward the inboard side of the vehicle, the connection tether 40 may pull the second chamber 30 toward the first chamber 20 (outboard side) using the support force of the second chamber 30. Therefore, the head H can be prevented from being away from the second chamber 30.

In case of the oblique collision of the vehicle, the load of the head H may be first absorbed by the tensile force $F_2$ of the connection tether 40, and then absorbed by the buffering force $F_1$ of the second chamber 30. At this time, the connection tether 40 may primarily absorb the load of the head H through the pulling force of the first chamber 20, and the second chamber 30 may secondarily absorb the shock of the head H while deformed by the load of the head H. The load of the head H, transferred to the second chamber 30, may be transferred to the first chamber 20 and thus tertiarily absorbed.

Next, the operation of the airbag apparatus in case of a head-on collision of the vehicle will be described.

Figure 15:
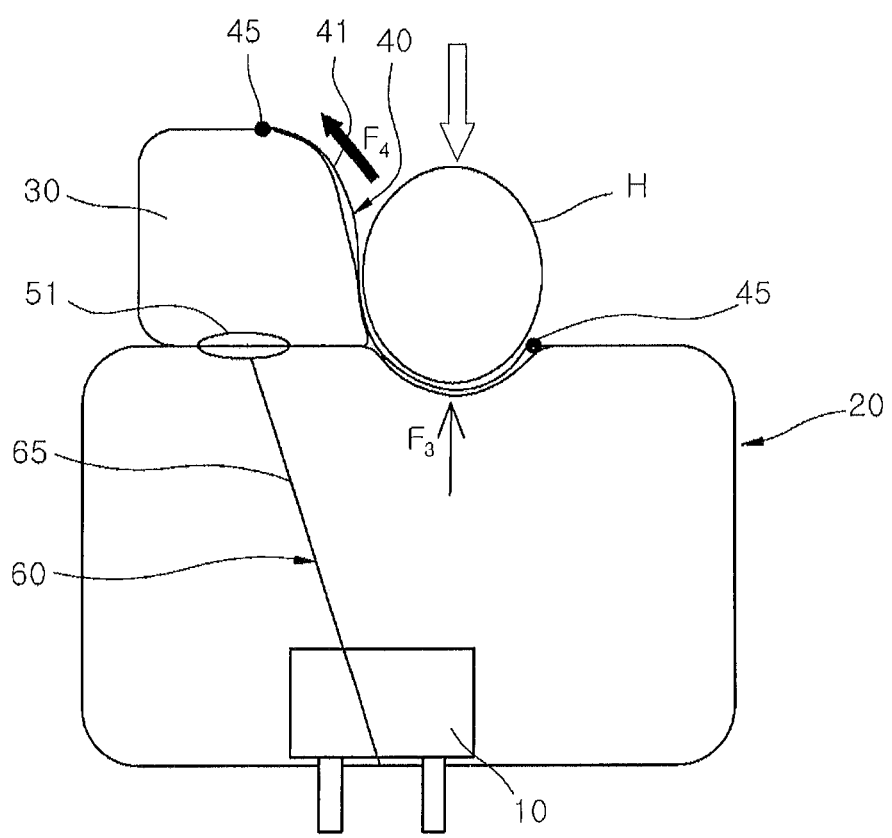
FIG. 15 is a plan view illustrating that the head collides with the first chamber in the airbag apparatus in accordance with the embodiment of the present invention, in case of a head-on collision of the vehicle.

FIG. 15 is a plan view illustrating that the head collides with the first chamber in the airbag apparatus in accordance with the embodiment of the present invention, in case of a head-on collision of the vehicle.

Referring to FIG. 15, the first chamber 20 may be disposed in front of the head H. Thus, in case of a head-on collision of the vehicle, the head H may be moved toward the first chamber 20. At this time, the second chamber 30 may be eccentrically disposed at the inboard side of the first chamber 20 so as to avoid a collision with the head H of the passenger in case of the head-on collision of the vehicle. Therefore, although the second chamber 30 is expanded and deployed toward the rear in case of a head-on collision of the vehicle, the head H can be prevented from being pushed rearward by the second chamber, which makes it possible to prevent the head from being injured or bent rearward by the second chamber 30.

As the first chamber 20 is deformed by the load of the head H, both ends of the connection tether 40 may be pulled by the second chamber 30. Therefore, the load of the head H may be primarily absorbed by the tensile force $F_4$ of the connection tether 40, and secondarily absorbed by the buffering force $F_3$ of the first chamber 20.

In accordance with the embodiments of the present invention, the second chamber may be connected to one side of the first chamber so as to be supported by the first chamber, and suppress the head of the passenger from moving in a diagonal direction in case of an oblique collision of the vehicle. Therefore, the head of the passenger can be prevented from being pushed or turned to one side of the second chamber, and prevented from being away from the second chamber. Furthermore, since a turn of the head is prevented in case of an oblique collision of the vehicle, an injury of the head or the neck can be prevented.

Furthermore, the second chamber may be eccentrically disposed at the inboard side of the first chamber so as to avoid a collision with the head of the passenger in case of a head-on collision of the vehicle. Therefore, although the second chamber is expanded and deployed rearward in case of the head-on collision of the vehicle, the head of the passenger can be prevented from being bent rearward or injured by the second chamber.

Furthermore, after the second chamber is double-folded in such a manner that one side thereof is introduced to the inside, the folded part may be temporarily attached. Therefore, the length of the second chamber can be increased more than when the second chamber is installed without a folded part. Thus, when the second chamber is expanded and deployed, the expansion height of the second chamber can be increased.

Furthermore, since the communication part includes the communication tube and the one or more communication holes, the gas passage area between the first and second chambers can be increased. Therefore, since the flow rate or velocity of the gas introduced into the second chamber is increased, the second chamber can be rapidly deployed, and thus completely deployed before the head of the passenger reaches the second chamber.

Furthermore, since the connection tether pulls the second chamber to the inboard side, the head can be prevented from being away or separated from the second chamber. Therefore, although the sizes of the first and second chambers are not increased, it is possible to protect the head.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus comprising:
   a first chamber connected to an inflator, and configured to support the head of a passenger in case of a head-on collision of a vehicle;
   a second chamber connected to one side of the first chamber so as to be supported by the first chamber, and configured to suppress the head of the passenger from moving in a diagonal direction in case of an oblique collision of the vehicle;
   a communication part formed in the first chamber so as to introduce gas of the first chamber into the second chamber; and
   a valve tether installed along a circumference of the communication part, connected to the first chamber, and configured to close the communication part when the first chamber is completely deployed,
   wherein the communication part comprises:
      a communication tube formed on the first chamber to introduce gas of the first chamber into the second chamber, and having the valve tether connected thereto, and
      one or more communication holes formed in the first chamber to introduce the gas of the first chamber into the second chamber,
   wherein the valve tether is obliquely disposed toward the widthwise center of the first chamber.

2. The airbag apparatus of claim 1, wherein the second chamber is eccentrically disposed at an inboard side of the first chamber so as to avoid a collision with the head of the passenger in case of a head-on collision of the vehicle.

3. The airbag apparatus of claim 2, wherein the second chamber is double-folded in such a manner that one side thereof is introduced to the inside, and
   a folded part of the second chamber is temporarily attached to the first chamber.

4. The airbag apparatus of claim 1, wherein the communication tube has a larger diameter than the one or more communication holes.

5. The airbag apparatus of claim 1, wherein the communication tube has a ring-shaped tightening channel part formed at the circumference thereof, and
   the valve tether comprises:
      a tether ring part installed through the tightening channel part; and
      a tether pulling part connected to the tether ring part to pull the tether ring part, and connected to the first chamber so as to close the communication tube by pulling the tether ring part, when the first chamber is completely deployed.

6. The airbag apparatus of claim 1, further comprising:
   a connection tether connecting the first and second chambers so as to restrict the second chamber from being pushed to an outside of the first chamber by the head.

7. The airbag apparatus of claim 6, wherein the second chamber is eccentrically disposed at an inboard side of the first chamber so as to avoid a collision with the head of the passenger in case of a head-on collision of the vehicle.

8. The airbag apparatus of claim 6, wherein one side of the connection tether is connected to the second chamber, and
   the other side of the connection tether is connected to the first chamber so as to be separated from the second chamber.

9. The airbag apparatus of claim 6, wherein one side of the connection tether is connected to the second chamber, and
   the other side of the connection tether is connected to a second sewed part of the first chamber or an edge of the second sewed part.

10. The airbag apparatus of claim 6, wherein both sides of the connection tether are fixed to the first and second chambers by connection sewed parts.

11. The airbag apparatus of claim 6, wherein the connection tether comprises a surface tether which connects a rear side of the first chamber and a rear side of the second chamber.

12. The airbag apparatus of claim 6, wherein the connection tether comprises one or more line tethers which connect a rear side of the first chamber and a rear side of the second chamber.

13. The airbag apparatus of claim 6, wherein the communication tube has a ring-shaped tightening channel part formed at the circumference thereof, and
   the valve tether comprises:
      a tether ring part installed through the tightening channel part; and
      a tether pulling part connected to the tether ring part to pull the tether ring part, and connected to the first chamber so as to close the communication tube by pulling the tether ring part, when the first chamber is completely deployed.

* * * * *